United States Patent [19]

Halberstadt et al.

[11] 4,057,675
[45] Nov. 8, 1977

[54] ELECTROCHEMICAL CELL

[75] Inventors: Harry J. Halberstadt, Los Altos; Leroy S. Rowley, San Jose, both of Calif.

[73] Assignee: Lockheed Missiles & Space Company, Inc., Sunnyvale, Calif.

[21] Appl. No.: 443,905

[22] Filed: Feb. 19, 1974

[51] Int. Cl.$^2$ .................... H01M 4/40; H01M 12/02
[52] U.S. Cl. .................................. 429/39; 429/101; 429/105; 429/66; 429/218
[58] Field of Search ............. 136/83 R, 100 R, 86 A, 136/154, 10-12, 132, 86 A; 429/39, 101, 105

[56] References Cited

U.S. PATENT DOCUMENTS

| 267,319 | 11/1882 | Berstein | 136/100 R |
|---|---|---|---|
| 273,739 | 3/1883 | Jablochkoff | 136/100 R |
| 884,264 | 4/1908 | Carpenter | 136/159 |
| 2,925,358 | 2/1960 | De Maio et al. | 136/154 |
| 2,937,219 | 5/1960 | Minnick et al. | 136/154 X |
| 3,043,898 | 7/1962 | Miller et al. | 136/86 A |
| 3,359,136 | 12/1967 | Merten et al. | 136/86 A |
| 3,551,208 | 12/1970 | Stachurski | 136/86 A |
| 3,791,871 | 2/1974 | Rowley | 136/100 R |
| 3,813,301 | 5/1974 | Carr | 136/86 A |

*Primary Examiner*—Allen B. Curtis
*Attorney, Agent, or Firm*—Richard H. Bryer; Billy G. Corber

[57] ABSTRACT

In a reactive metal-water electrochemical cell, an anode-cathode configuration providing for direct anode-cathode contact by use of a mesh-screen cathode essentially contacting the anode over its full surface. Optionally, the screen is supported on a plurality of ribs formed on or attached to a cathode backplate, the ribs forming electrolyte channels between the cathode screen and the cathode backplate. The configuration can be utilized for both unipolar and bipolar electrodes. Provision is made for maintaining contact between the cathode screen and the anode as the anode is consumed, thereby maintaining efficiency of the battery. Voltage and power output of the cell is controlled by varying electrolyte concentration or temperature, or both.

1 Claim, 5 Drawing Figures

ELECTROCHEMICAL CELL

BACKGROUND OF THE INVENTION

This application describes and claims certain improvements in the basic electrochemical cell disclosed in U.S. patent application Ser. No. 133,833 filed Apr. 14, 1971, now U.S. Pat. No. 3,791,871.

The basic mechanism of operation of the cell described in the aforementioned patent application is incorporated by reference in this application. Briefly, the cell utilizes an alkali metal anode (highly reactive with water) spaced from a cathode by an electrically insulating film which forms naturally on the anode in the presence of water. This thin film permits the cathode to be placed in direct contact with the anode. The resulting reduction in the anode-cathode spacing to a thickness equal to the anode film thickness greatly reduces the $I^2R$ losses which would otherwise be present and results in increased power output and energy density. The anode and cathode are immersed in an aqueous electrolyte which, in the embodiment shown in the aforesaid patent application, is a liquid solution in water of an alkali metal hydroxide.

SUMMARY OF THE INVENTION

Briefly, in accordance with the invention, there is described a configuration which overcomes difficulties otherwise encountered when the physical location of the cathode is, but for the insulating film, in direct contact with the anode over its entire operating surface. By means of the configuration, provision is made for the maximum amount of anode surface to be exposed to the cathode.

More particularly, in accordance with the invention, these conflicting requirements are satisfied by utilizing as the cathode in unipolar cells an open-mesh metallic screen contoured to contact the anode over substantially the entire anode operating surface. In bipolar cells, the screen, again contoured to contact the anode over substantially the entire anode operating surface, is supported on a plurality of ribs formed on or attached to a cathode backplate, the ribs forming electrolyte channels between the cathode screen and the cathode backplate. While a ribbed cathode backplate could be utilized in the unipolar cell, there is no necessity to do so since, in contrast to bipolar cells, unipolar cells inherently have designed into them an electrolyte channel between the electrodes and the walls of the cell case.

In both unipolar and bipolar cells, the electrolyte flows by the cathode face away from the anode with access to the anode provided by the open-mess metallic screen. The term "mesh screen" is intended to cover any related form such as expanded metal, pierced plate, woven mat, multiple ribs and others.

Provision is also made in the cells of the invention for maintaining anode-cathode contact as the anode is consumed during operation. This technique permits the anode-cathode configuration to be progressively compressed as the anode is consumed, thereby permitting the cell to operate at maximum power and efficiency until the anode is depleted.

DESCRIPTION OF THE DRAWING

The various features and advantages of the invention will become apparent upon consideration of the following description taken in conjunction with the accompanying drawing of the preferred embodiments of the invention. The views of the drawing are as follows.

DESCRIPTION OF THE PREFERRED EMBODIMENT

Figure 1:
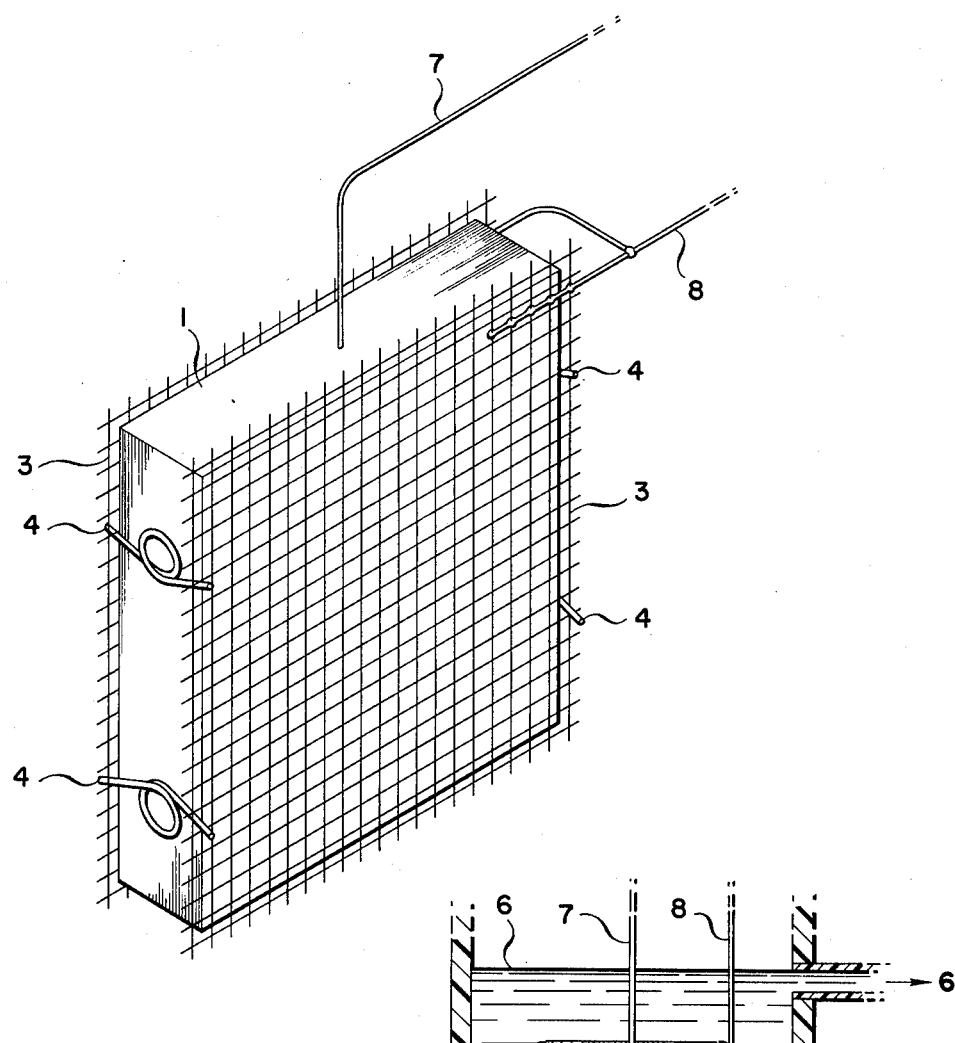
FIG. 1 is an isometric view of a unipolar electrode of the invention.
Figure 2A:
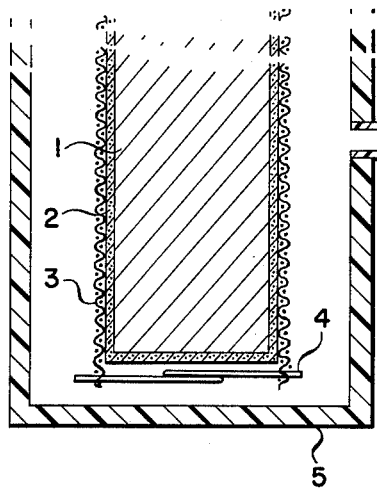
FIG. 2A is a top cross-sectional view of a unipolar cell of the invention utilizing the electrode of FIG. 1.
Figure 2B:
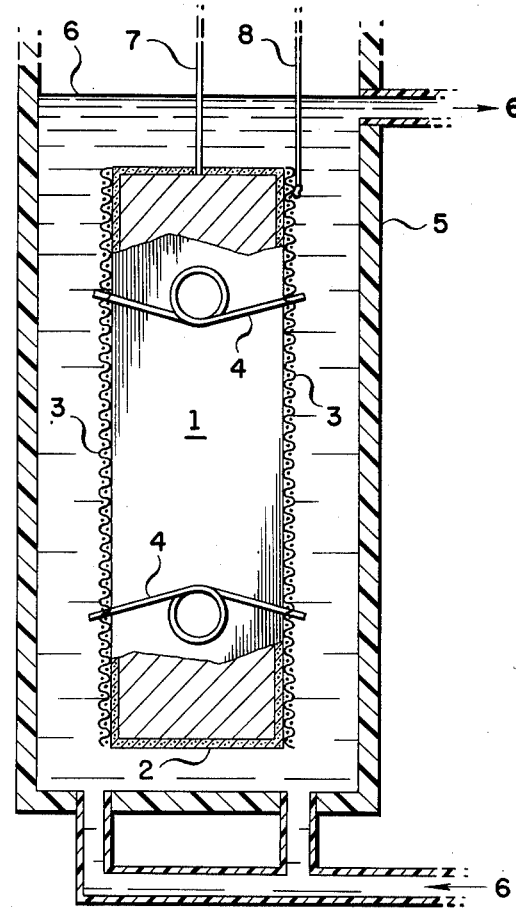
FIG. 2B is an edge cross-sectional view of the unipolar cell of FIG. 2A.

With references to FIGS. 1, 2A and 2B, where like reference characters designate corresponding parts throughout the several views, there is depicted unipolar electrodes of the invention and a unipolar cell utilizing the electrodes. Anode 1 with the insulating film 2 thereon is held between two screen cathodes 3 by means of spring 4. This assembly is encased in an insulating container 5 through which electrolyte 6 is circulated, bring in new fuel for the electrochemical reaction and carrying out the products of reaction. As the anode is consumed, springs 4 keep the cathode screens 3 pressed tightly to the anode surfaces. Electrical energy is conducted out of the cell through the insulated anode conductor 7 and the uninsulated cathode conductor 8.

Anode 1 is formed of an alkali metal such as sodium or lithium which is highly reactive with water, and in the presence of water naturally forms on its surface a protective insulating film. Molarity of the electrolyte is varied, as discussed in patent application Ser. No. 133,833, to control power output of the battery. Alloys and compounds of the alkali metals and other reactive metals should be equally feasible for use as the anode provided they are substantially as reactive with water as are sodium and lithium and further provided, in common with sodium and lithium, they naturally form a continuous insulating film in the presence of water.

The open-mesh screen cathode is of any suitable electrically conductive material which is non-reactive with water and will permit electrochemical reduction of water during operation of the cell. The efficiency with which different materials effect the reduction of water is a factor in the selection of the cathode material as are such additional factors as cost, availability, and durability. Based on these considerations, iron and nickel are preferred materials with materials such as black platinum or black nickel providing increased efficiency at the expense of high cost and reduced durability. The minimum size of the open-mesh screen is governed by the need to get electrolyte to the anode face plus the need to remove the products of reaction away from the anode face. The maximum size of the screen is governed by the desire to keep all parts of the anode face as near as possible to some part of the cathode. Within these limits one skilled in the art can readily choose that particular size which is optimum for the particular cell contemplated. Illustratively, for an anode surface measuring 5 inches by 11 inches, an expanded metal screen with 0.003 inch metal and 0.1 inch by 0.05 inch openings has produced excellent results. As a comparison, expanded metal with 0.062 inch metal and 0.375 inch openings reduced power output by approximately 30 percent.

In the depicted cell, provision is made for maintaining anode-cathode contact by means of springs 14. It is readily apparent to one skilled in the art that springs 4 are only one of many possible configurations for achieving comparable results.

In cells employing either unipolar or bipolar electrodes in accordance with the invention, the electrolyte handling system is essentially identical in its preferred embodiment. Electrolyte from a common source is pumped into the battery, circulated through the battery and returned to the central source. This ensures uniformity of molarity and temperature which substantially improves uniformity of voltage and power output, particularly between the individual cells of a battery. While being circulated the electrolyte can also be cooled and diluted with additional water as needed to maintain a desired power output. Either temperature or dilution, or both, may be varied as the control parameter. Hydrogen gas and excess electrolyte are vented during the circulating process.

Batteries characteristically decline in both voltage and power during discharge reaching a point of unacceptably low voltage long before the active materials are consumed. In the unipolar and bipolar cells of the invention, however, voltage and power are maintained at the desired level throughout the life of the anode. The voltage and power output per unit area of reactive metal-water electrochemical cells of the invention are primarily dependent on electrolyte concentration and temperature. The temperature is normally maintained relatively constant and control of voltage and power is accomplished by varying the rate at which water is added to the electrolyte. The control function input used to control battery output is total battery voltage. Variations of battery voltage above or below the specified level are used as input signals to change the rate of water addition to the electrolyte. Shut down of the cells of the invention is accomplished by draining the electrolyte from the cells. For cold water environments, the electrolyte may desirably contain any recognized antifreeze such as ethylene glycol to reduce the freezing point of electrolyte. The amount of antifreeze used is limited only by the availability of water required for the cell's electrochemical reaction, with amounts up to at least 50 percent by volume of electrolyte being tolerated without adversely reducing the availability of required water. While the electrolyte in that embodiment shown in the aforesaid patent application is an aqueous alkali metal hydroxide, any one of a number of other aqueous solutions should be equally feasible provided such aqueous electrolytes have the requisite film forming characteristics.

Illustratively, a twelve cell unipolar battery having the following characteristics was operated:

| Battery Size | 13" × 13" 10" |
| --- | --- |
| Cell Size | 6" × 12" × 0.5" |
| Cell Area | 144 square inches |
| Current Density | 1.18 AMPS/in$^2$ |
| Electrolyte | 3.0+ Molar LiOH SOLN. |
| Temperature | 20° C – 22° C |
| Flow rate | 3 gal/min. |
| Maximum Power | 2040 Watts |
| Number of Cells | 12 |

Figure 3B:
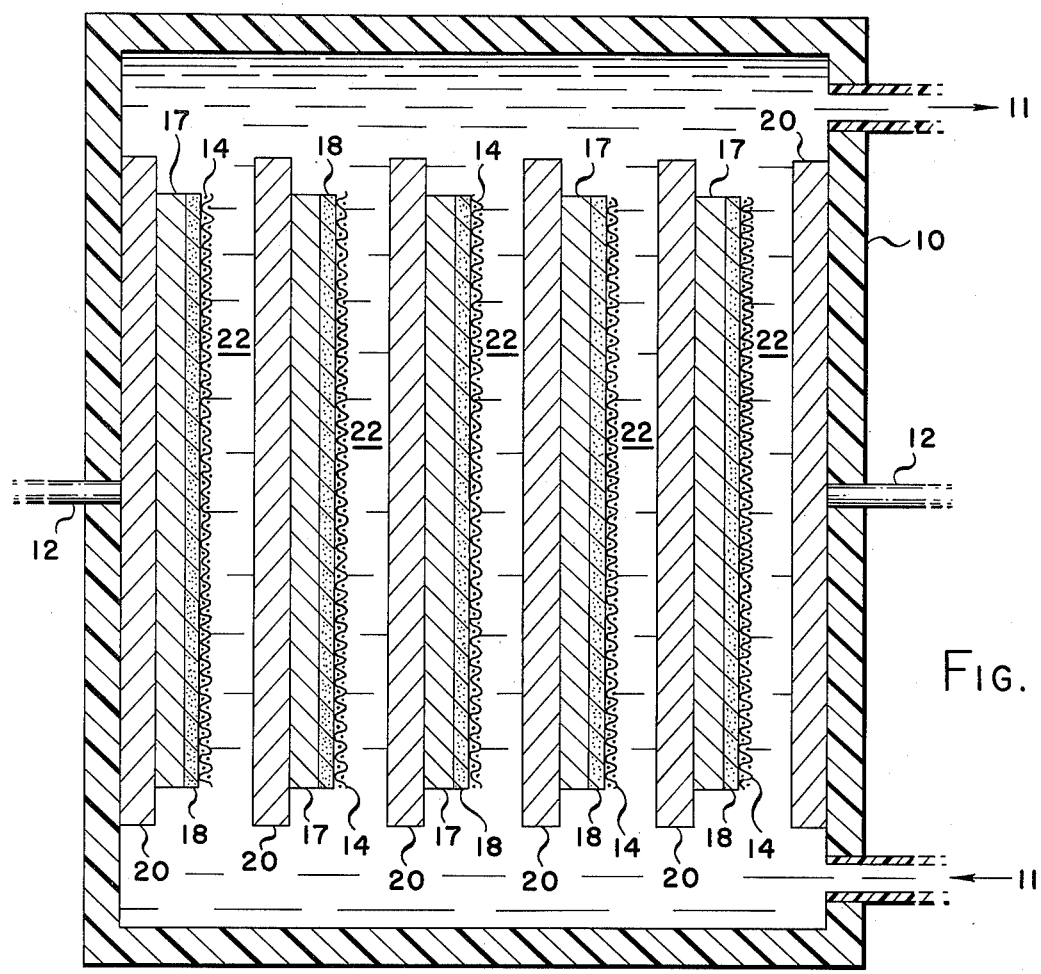
FIG. 3B is an edge cross-sectional view of the bipolar cell of FIG. 3A.
Figure 3A:
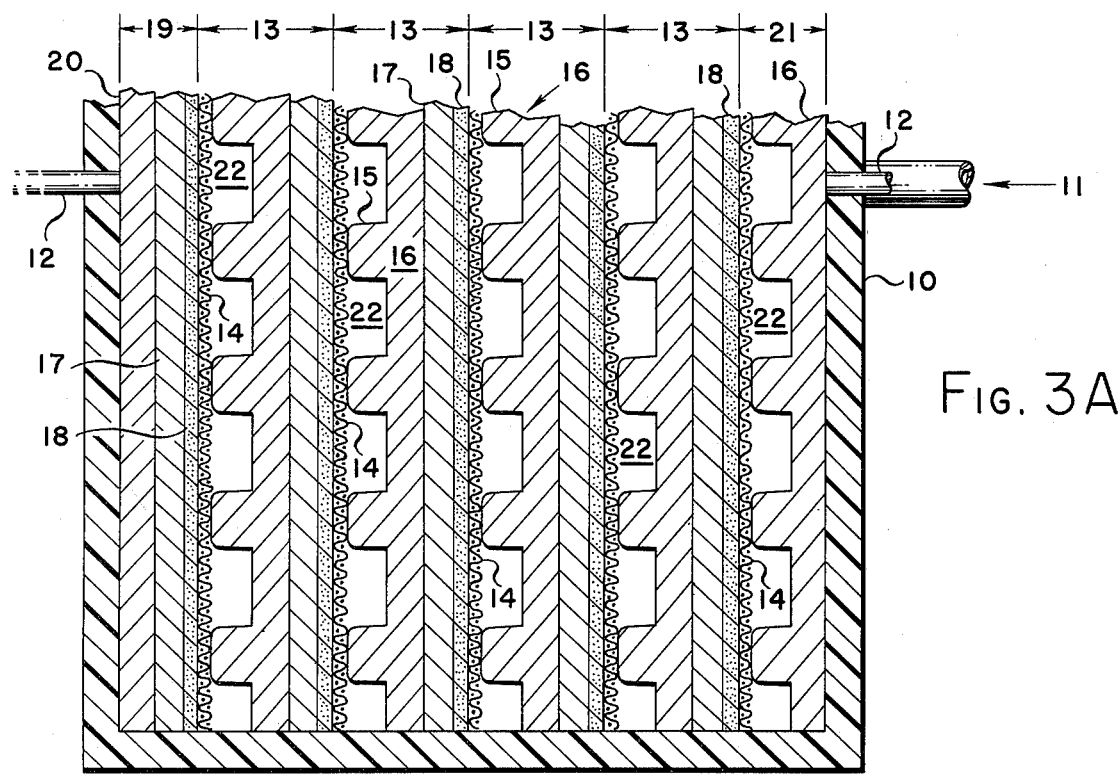
FIG. 3A is a top cross-sectional view of a bipolar cell of the invention.

With reference to FIGS. 3A and 3B, where like reference characters designate corresponding parts throughout the several views, there is depicted a bipolar cell of the invention. Such a cell is composed of a plurality of bipolar electrodes connected in series internally. Similar to the unipolar cell of the invention, the anode and cathode are in direct contact, with the anode having formed on its surface the protective insulating film. Means are provided for circulating the electrolyte through each electrode and making electrical contact with the adjacent electrode. The materials used for the anode, cathode and electrolyte are in accordance with the preceding discussion of the unipolar cell of the invention as is also the control means for the bipolar cell.

Insulating case 10 contains the cell stack, provides when desired the stack compressing mechanism of FIG. 2, not shown, for maintaining anode-cathode contact as the anode is consumed during operation, provides the ingress and egress chambers for distribution of electrolyte 11, and provides the openings whereby electrical power is conducted outside the battery through connectors 12. Bipolar electrodes 13 comprise an open-mesh cathode screen 14 supported on ribs 15 formed in or welded to cathode backplate 16. On the reverse side of cathode backplate 16 is bonded an alkali metal anode 17, the surface of which is covered by insulating film 18. The end unipolar electrode 19 consists of alkali metal anode 17 having insulating film 18 thereon and bonded to anode backplate 20 which supports the anode and conducts electrical energy to connector 12. End cathode 21 consists of cathode screen 14 supported on ribs 15 formed in or welded to cathode backplate 16. Electrolyte 11 enters case 10 at the bottom, rises through electrolyte channels 22 formed by ribs 15 between cathode screen 14 and cathode backplate 16 and exits from the top of case 10.

Illustratively, a three cell bipolar battery of the invention having the following characteristics was operated:

| Battery Size | 1" × 6" × 2.75" |
| --- | --- |
| Cell Size | 2.25" × 4" × 0.25" |
| Cell Area | 9 square inches |
| Current Density | 1.8 Amps./in.$^2$ |
| Electrolyte | 3.5 Molar LIOH SOLN. |
| Temperature | 20° C |
| Flow Rate | 14 Ga. Per Hour |
| Maximum Power | 48 Watts at 3.0 Volts |
| Number of Cells | 3 |

What is claimed is:

1. In a reactive metal anode-aqueous electrolyte electrochemical cell, a plurality of bipolar electrodes connected in series, each bipolar electrode consisting of an open mesh electrically conducting cathode screen supported on a ribbed cathode backplate, said ribs forming continuous electrolyte channels between said cathode screen and said cathode backplate, and an alkali metal anode bonded to the reverse side of said cathode backplate, the surface of said anode being covered by a protective insulating film naturally formed on said anode in the presence of water, and means for maintaining anode-cathode contact between the plurality of electrodes as the anodes are consumed during operation of the cell.

* * * * *

UNITED STATES PATENT OFFICE
CERTIFICATE OF CORRECTION

Patent No. 4,057,675     Dated   November 8, 1977

Inventor(s)  Harry J. Halberstadt and Leroy S. Rowley

It is certified that error appears in the above-identified patent and that said Letters Patent are hereby corrected as shown below:

In Col. 1, line 3, before the sentence starting with "This application describes and claims . . ." insert the following sentence:

---The invention herein described was made in the course of or under a contract or subcontract thereunder, with the Navy Department.---

Signed and Sealed this

Twenty-fifth Day of April 1978

[SEAL]

Attest:

RUTH C. MASON
Attesting Officer

LUTRELLE F. PARKER
Acting Commissioner of Patents and Trademarks